May 15, 1956  C. G. SUITS  2,745,713
HIGH TEMPERATURE HIGH PRESSURE REACTOR
Filed Oct. 29, 1952
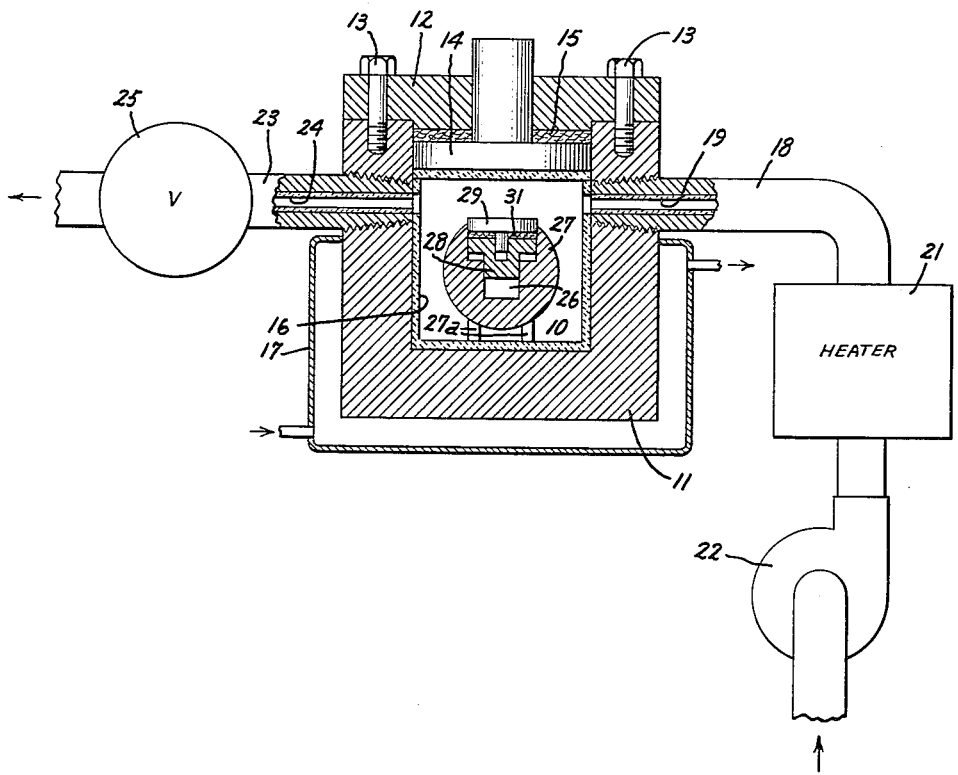
Inventor:
Chauncey G. Suits,
by Paul A. Frank
His Attorney.

2,745,713
Patented May 15, 1956

2,745,713
HIGH TEMPERATURE HIGH PRESSURE REACTOR

Chauncey G. Suits, Schenectady, N. Y., assignor to General Electric Company, a corporation of New York Application October 29, 1952, Serial No. 317,395

11 Claims. (Cl. 23—1)

This invention relates to a method and apparatus for creating an environment of very high pressure and very high temperature.

The region of very high pressures accompanied by very high temperatures constitutes an area which has been explored very slightly. There has been a good deal of work performed within the pressure range of 30,000 atmospheres to 60,000 atmospheres at room temperature. Vessels which have an internal pressure of between 30,000 atmospheres and 60,000 atmospheres must be very carefully designed in order to avoid an explosive rupture at room temperature. The operation of such high pressure apparatus at high temperatures greatly increases the problems of design and construction. The first problem which must be solved is that of producing a material of sufficient structural strength to withstand the high temperatures under the operating pressures of the apparatus. A second serious problem involves the method by which heat is brought into the pressure chamber. For example, if the heat is produced by electrical conduction, it is necessary to employ insulating bushings which will themselves tolerate the extremely high temperatures and pressures encountered. These bushings impose a serious limitation on the attainable pressures and temperatures.

Thus, one of the objectives of this invention is to provide a high temperature high pressure apparatus which is heated by a means other than an electric heating element.

Another object of the invention is to provide a high temperature high pressure reactor in which a single hydraulic fluid is utilized for both heating and pressure.

It is a further object of the invention to provide a multi-stage reactor wherein a single fluid is utilized to establish high temperature and high pressure conditions.

Briefly stated, in accordance with one of its aspects, this invention comprises a thick-walled outer chamber, an inlet tube providing a passage to the interior of the chamber, an outlet tube providing a passage from the chamber, an inner chamber positioned within the outer chamber, a cylindrical cavity of two diameters within the inner chamber, the smaller diameter constituting the bottom portion of the cavity serving as a space for positioning a charge to be subjected to heat and pressure, a piston positioned in the cavity, the piston having two diameters slightly smaller than the two diameters of the cavity whereby the piston is movable along the cavity axis and whereby pressure on the wide diameter portion of the piston is multiplied within the charge space, and a heat stable hydraulic fluid for circulating under pressure through the inlet tube, outer chamber and outlet tube.

The drawing is a sectional view illustrating the invention as applied to a 2-stage pressure chamber. An outer chamber 10 is defined by a box 11 of thick-walled construction having a top 12 maintained in place by a series of bolts 13 around the perimeter. The box 11 is preferably composed of a metal having a high tensile strength and possessing dimensional stability when subjected to pressure under high temperature conditions. Carbon steels are suitable for use with pressures of the order of a thousand atmospheres and temperatures of the order of 200° C. but environments of high temperature and pressure require the use of various ferrous and non-ferrous alloys. In order to protect the metal of which the box 11 is constructed it may be lined with a refractory material 16 composed of magnesia or silica and it may further be provided with a jacket 17 through which cooling fluids may be circulated. For operation at high temperatures the fluid circulating through the jacket 17 may be a metal rather than water.

The box 11 is sealed under pressure by means of a piston 14 forced by pressure against a gasket 15. For operating at a working temperature of the order of 1500° C. a suitable gasket is provided by a metal such as platinum.

An inlet tube 18 leads through the walls of the box 11 to the chamber 10. The tube 18 is composed of thick walls of a metal of high tensile strength and possessing dimensional stability at high temperatures. In order to avoid the undue loss of heat from fluid passing through the tube 18 the interior may be lined with a temperature resistant thermal insulation such as sintered granular quartz. Other refractory insulating materials may be utilized for the lining 19 of the tube 18. A heating element 21, shown in block form, is utilized to heat fluid passing through the inlet tube 18. The heating element 21 may be an electric resistance element, gas heating unit, or other heating means. Circulation of fluids through the tube 18 is provided by a pump 22. The pump 22 may be of the eddy current type when the hydraulic fluid is a liquid metal having sufficient electrical conductivity for operation in connection with this type of pump. In some operations a thermal syphon will provide sufficient circulation of the hydraulic fluid.

An outlet tube 23 connects to the chamber 10 through the walls of the box 11 and serves as a means for removing hydraulic fluid from the chamber 10. The interior of the tube 23 may be lined with an insulating material 24 similar to the insulating material 19 lining the tube 18. A valve 25 may be placed in the line of the tube 23 in order to restrict the flow of fluid through the tube 23 thereby controlling the pressure within the chamber 10.

It should be emphasized that the tubes 23 and 18 may be connected to form a circulatory passage for hydraulic fluid. In this event, the valve 25 may be omitted and pressure within the chamber 10 may be regulated by a separate pressure creating means (not shown).

Positioned within the chamber 10 is an inner chamber 26 defined by a receptacle 27 having a cylindrical cavity the bottom portion of which constitutes the inner chamber 26 and the top portion of which comprises a cylinder of enlarged diameter. The two cylinders forming the cavity are concentric. The receptacle 27 is maintained in an upright position by the legs 27a. The cavity defined by the receptacle 27 accommodates a piston 28 which is movable along the axis of the cavity walls. A tight seal between the piston 28 and cavity wall is effected by pressure applied to an associated piston 29 which is pressed against a gasket 31 to form a tight seal between the inner chamber 26 and outer chamber 10. The gasket 31 may be composed of a metal such as platinum in the same manner as the gasket 15.

The piston 28 provides a pressure multiplying relationship between the outer chamber 10 and inner chamber 26 depending upon the ratio of the face area of the piston 29 to the exposed area of the piston 28. Thus, if this area ratio is of the order of 3:1, the pressure within the chamber 26 is three times as great as the pressure within the chamber 10. The wall thickness of the receptacle 27 would not have to be very great in order to accommodate such a pressure differential even though the pressure within the chamber 26 might be as great as 60,000 atmospheres while the pressure within the chamber 10 might be only 20,000 atmospheres.

The use of liquid metallic elements, or mixtures thereof, as a circulating hydraulic fluid is very satisfactory. It is desirable that the hydraulic fluid used have a low melting point and a high boiling point. Satisfactory materials which fulfill these requirements are lead, indium, bismuth, sodium, potassium, gallium, lithium, and tin. Of these hydraulic fluids, gallium is preferred because of its low melting point (30° C.) and high boiling point (1600° C.) and lead and tin are satisfactory because of their comparative cheapness.

Additional pressure multiplying stages may be provided by enlarging the chamber 26 and providing a second receptacle similar to the receptacle 27 therein. However, such additional stages have not been illustrated since the additional structure is the same as the receptacle 27.

In operating the device illustrated the top cover 12 is removed along with the piston 14 and the piston 28 is removed from the receptacle 27. The substance or substances which are to be subjected to the high pressure high temperature environment are positioned within the inner chamber 26 which constitutes the charge space. The piston 28, gasket 31 and piston 29 are then placed in the receptacle 27 which is positioned within the chamber 10. The piston 14, gasket 15 and top cover 12 are then placed in the position illustrated and hydraulic fluid is pumped through the chamber 10. The hydraulic fluid is gradually heated by the heater 21 to the temperature to which it is desired to heat the charge and the fluid pressure is gradually increased either by means of the valve 25 and pump 22 or by a separate pressure regulating means until the pressure within the chamber 26 reaches the operating level. In the meantime, cooling fluid may be circulated through the jacket 17 to prevent collapse of the walls of the box 11. At the conclusion of the run the pressure is gradually decreased while the fluid is allowed to continue to circulate with the heater 21 shut off. Thus, the invention provides an apparatus having a single fluid which may be readily acted upon to achieve close control of the temperature and pressure within a reaction chamber.

While the present invention has been described with reference to particular embodiments thereof, it will be understood that numerous modifications may be made by those skilled in the art without actually departing from the invention. Therefore, I aim in the appended claims to cover all such equipment variations as come within the true spirit and scope of the foregoing disclosure.

What I claim as new and desire to secure by Letters Patent of the United States is:

1. A high pressure high temperature reaction vessel comprising a thick-walled outer chamber, an inlet tube providing a passage to the interior of said chamber, an outlet tube providing a passage from said chamber, an inner chamber positioned within said outer chamber, said inner chamber defining a cylindrical cavity of two diameters, the smaller diameter configuration being positioned in the bottom portion of the cavity, the small diameter portion defining a space for positioning a charge to be subjected to heat and pressure, a piston positioned in said cavity, said piston having two diameters slightly smaller than the two diameters of the cavity whereby said piston is movable along the cavity axis and pressure on the wide diameter portion of said piston is multiplied within said space, and means for circulating under pressure a heat stable hydraulic fluid through said inlet tube, outer chamber, and outlet tube.

2. A high pressure high temperature reaction vessel comprising a thick-walled outer chamber, an inlet tube providing a passage to said chamber, an outlet tube providing a passage from said chamber, and an inner chamber positioned within said outer chamber, said inner chamber defining a cavity of two diameters, the smaller diameter configuration being positioned in the bottom portion of the cavity, only the small diameter portion defining a space for positioning a charge to be subjected to heat and pressure, a piston conforming to the configuration of said cavity axially movable in said cavity, the top of said piston being open to the pressure within said outer chamber whereby pressure against the top of said piston is multiplied within the small diameter portion of said cavity.

3. A high pressure high temperature reaction vessel comprising an outer chamber having walls of a thickness to withstand high pressure, an inlet tube providing a passage to said chamber, an outlet tube providing a passage from said chamber, a flow control valve on said outlet tube, an inner chamber positioned within said outer chamber, said inner chamber defining a cavity having a cylindrical configuration of two different concentric diameters, the smaller diameter portion being at the bottom of the cavity and defining a charge space, the larger diameter portion being at the top of said cavity, a piston conforming to the configuration of said cavity and axially movable in said cavity whereby pressure against the large diameter end of the piston is multiplied through the small diameter end, and a hydraulic fluid in said outer chamber selected from the group consisting of lead, indium, bismuth, sodium, potassium, gallium, lithium, tin, and mixtures thereof.

4. Apparatus as claimed in claim 3 wherein the hydraulic fluid is gallium.

5. Apparatus as claimed in claim 3 wherein the hydraulic fluid is tin.

6. Apparatus as claimed in claim 3 wherein the hydraulic fluid is lead.

7. The method of subjecting a substance to high temperature and pressure which comprises first confining said substance in the cylindrical cavity of a first pressure vessel, confining said first pressure vessel within a second pressure vessel, and circulating through said second pressure vessel a single hydraulic fluid under pressure at the temperature to which the substance is to be subjected, said hydraulic fluid acting upon said first pressure vessel to subject the substance therein to a pressure higher than that of the hydraulic fluid.

8. The method of subjecting a substance to high temperature and pressure which comprises confining said substance in the cylindrical cavity of a first pressure vessel, confining said first pressure vessel within a second pressure vessel, and circulating through said second pressure vessel a hydraulic fluid under pressure at the temperature to which the substance is to be subjected selected from the group consisting of lead, indium, bismuth, sodium, potassium, gallium, lithium, and tin, said hydraulic fluid acting upon said first pressure vessel to subject the substance therein to a pressure higher than that of the hydraulic fluid.

9. A method as claimed in claim 8 wherein the hydraulic fluid is gallium.

10. A method as claimed in claim 8 wherein the hydraulic fluid is tin.

11. A method as claimed in claim 8 wherein the hydraulic fluid is lead.

References Cited in the file of this patent

UNITED STATES PATENTS

| Number | Name | Date |
| --- | --- | --- |
| 1,159,865 | Pier | Nov. 9, 1915 |
| 1,377,517 | Novotny | May 10, 1921 |
| 2,131,753 | Reid | Oct. 4, 1938 |
| 2,303,339 | Dreyfus | Dec. 1, 1942 |
| 2,371,381 | Campbell et al. | Mar. 13, 1945 |
| 2,517,090 | Denning | Nov. 9, 1946 |